(12) United States Patent
Lim et al.

(10) Patent No.: US 10,354,057 B2
(45) Date of Patent: Jul. 16, 2019

(54) DETECTION OF UNAUTHORIZED USER ASSISTANCE OF AN ELECTRONIC DEVICE BASED ON THE DETECTION OR TRACKING OF EYES

(71) Applicant: MOTOROLA SOLUTIONS, INC., Chicago, IL (US)

(72) Inventors: Bing Qin Lim, Pulau Pinang (MY); Boon Kheng Hooi, Kedah (MY); Wai Mun Lee, Penang (MY); Mun Yew Tham, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 131 days.

(21) Appl. No.: 15/393,094

(22) Filed: Dec. 28, 2016

(65) Prior Publication Data
US 2018/0181776 A1 Jun. 28, 2018

(51) Int. Cl.
*G06F 21/32* (2013.01)
*G06F 21/84* (2013.01)
*G06F 21/62* (2013.01)
*G06K 9/00* (2006.01)
*G06F 3/01* (2006.01)

(52) U.S. Cl.
CPC .............. *G06F 21/32* (2013.01); *G06F 3/013* (2013.01); *G06F 3/017* (2013.01); *G06F 21/6218* (2013.01); *G06F 21/6245* (2013.01); *G06F 21/84* (2013.01); *G06K 9/0061* (2013.01); *G06K 9/00604* (2013.01); *G06F 2221/2149* (2013.01)

(58) Field of Classification Search
CPC .......... G06F 21/32; G06F 21/84; G06F 3/013; G06F 3/017
See application file for complete search history.

(56) References Cited

U.S. PATENT DOCUMENTS

| 6,263,311 | B1 | 7/2001 | Dildy | |
|---|---|---|---|---|
| 6,480,825 | B1 * | 11/2002 | Sharma | G07C 9/00158 704/270 |
| 7,986,816 | B1 * | 7/2011 | Hoanca | G06K 9/00892 382/115 |

(Continued)

OTHER PUBLICATIONS

Kumar et al., "Reducing Shoulder-surfing by Using Gase-based Password Entry," specification (2007) 7 pages, http://hci.stanford.edu/cstr/reports/2007-05.pdf.

*Primary Examiner* — Dao Q Ho
(74) *Attorney, Agent, or Firm* — Michael Best & Friedrich LLP

(57) ABSTRACT

Methods and systems are provided in this disclosure for operating an electronic device. The electronic device includes a user interface, a camera, and an electronic processor. The electronic processor determines whether a user assistance restriction is established for a current functional operation of the electronic device. The camera captures at least one image, the electronic processor analyzes the at least one image to detect one or more eyes in the field of view of the camera, and the electronic processor detects a violation of the user assistance restriction for the current functional operation based at least in part on the analysis of the at least one image. When a violation of the user assistance restriction is detected, the electronic processor adjusts one or more operations of the electronic device.

20 Claims, 10 Drawing Sheets

(56) References Cited

U.S. PATENT DOCUMENTS

| | | | |
|---|---|---|---|
| 8,237,571 B2* | 8/2012 | Wang | G10L 17/26 |
| | | | 340/506 |
| 8,289,130 B2* | 10/2012 | Nakajima | G06F 21/552 |
| | | | 340/5.3 |
| 8,769,556 B2* | 7/2014 | Guo | G06K 9/00677 |
| | | | 382/118 |
| 2003/0163708 A1 | 8/2003 | Tang | |
| 2009/0259588 A1* | 10/2009 | Lindsay | G06F 21/31 |
| | | | 705/40 |
| 2010/0079508 A1* | 4/2010 | Hodge | G06F 3/013 |
| | | | 345/697 |
| 2013/0091561 A1 | 4/2013 | Bruso et al. | |

* cited by examiner

DETECTION OF UNAUTHORIZED USER ASSISTANCE OF AN ELECTRONIC DEVICE BASED ON THE DETECTION OR TRACKING OF EYES

BACKGROUND OF THE INVENTION

Some electronic devices are designed to be secured, restricting access to particular users. For example, a smart phone or tablet computer may require entry of a password in order to access the device or certain functionality of the device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
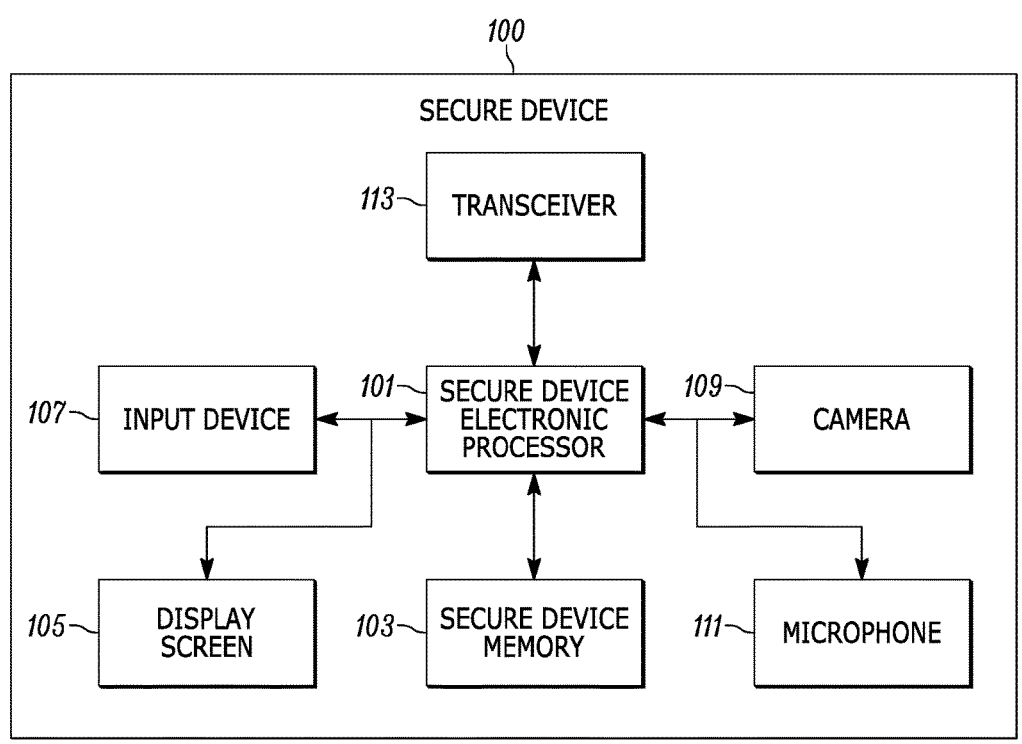
FIG. 1 is a block diagram of a secured electronic device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Methods and systems are provided in this disclosure for operating an electronic device. The electronic device includes a user interface, a camera, and an electronic processor. The electronic processor determines whether a user assistance restriction is established for a current functional operation of the electronic device. The camera captures at least one image, the electronic processor analyzes the at least one image to detect one or more eyes in the field of view of the camera, and the electronic processor detects a violation of the user assistance restriction for the current functional operation based at least in part on the analysis of the at least one image. When a violation of the user assistance restriction is detected, the electronic processor adjusts one or more operations of the electronic device.

FIG. 1 is a block diagram of a secure device 100. The secure device 100 is an electronic device that includes a secure device electronic processor 101 and a secure device memory 103. The secure device memory 103 is a non-transitory computer-readable memory that stores instructions that are accessed and executed by the secure device electronic processor 101 to provide the functionality of the secure device 100 such as described further below. The secure device 100 also includes a user interface. In the example of FIG. 1, the user interface includes a display screen 105 and an input device 107. In some implementations, the input device 107 may include a keypad and the display screen 105 may include a graphic display screen or a segmented liquid crystal display ("LCD") screen configured to display only alphanumeric characters. In other implementations, the user interface includes a touch-sensitive display screen that embodies both the input device 107 and the display screen 105. The input device 107 and the display screen 105 are communicative coupled to the secure device electronic processor 101. The secure device electronic processor 101 receives user inputs through the input device 107 and causes the display screen 105 to display output information viewable by the user. The secure device 100 also includes a camera 109 and a microphone 111.

In the example of FIG. 1, the secure device 100 also includes a wired or wireless transceiver 113 configured to facilitate communication between the secure device electronic processor 101 and one or more remotely located systems. In various implementations, the transceiver 113 may be configured to provide wireless communications using one or more wireless communications protocols including, for example, cellular phone networks, wifi, Bluetooth, or near field communication ("NFC"). In other implementations, the transceiver 113 may be configured to provide communication over a wired interface including, for example, Ethernet. In still other implementations, the secure device 100 may not include any transceiver 113 and may not be configured to communication with any external device or system.

Figure 2:
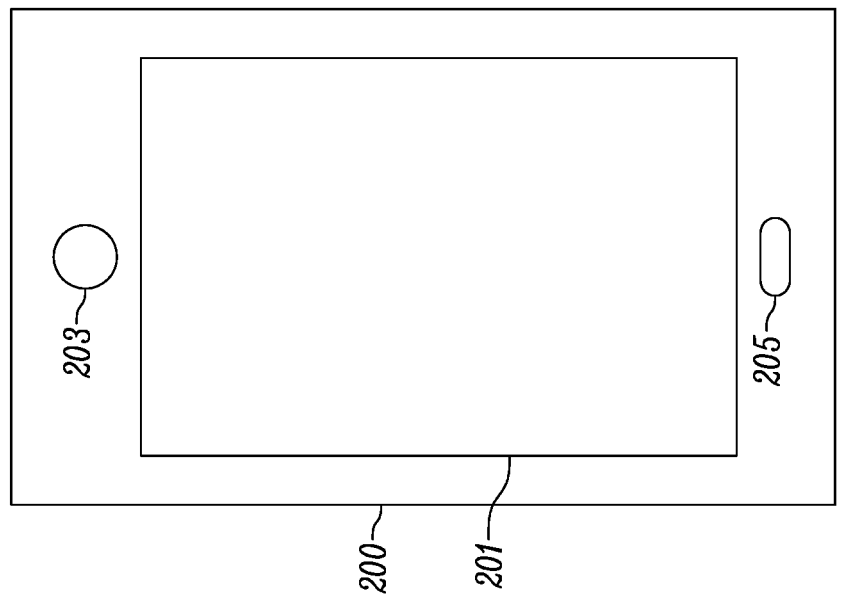
FIG. 2 is a front view of a smart phone device configured as the secured electronic device of FIG. 1 in accordance with some embodiments.

The secure device 100 of FIG. 1 can be implemented as various different types of secure electronic devices. For example, FIG. 2 shows an example of the secure device 100 implemented as a smart phone 200. The smart phone 200 includes a touch-sensitive display 201 as its user interface and a front-facing camera 203 configured to capture images of a user operating the smart phone 200. The smart phone 200 also includes a microphone 205 positioned to capture audio during telephone calls or to capture other audio stream data such as described further in some of the examples below.

Figure 3:
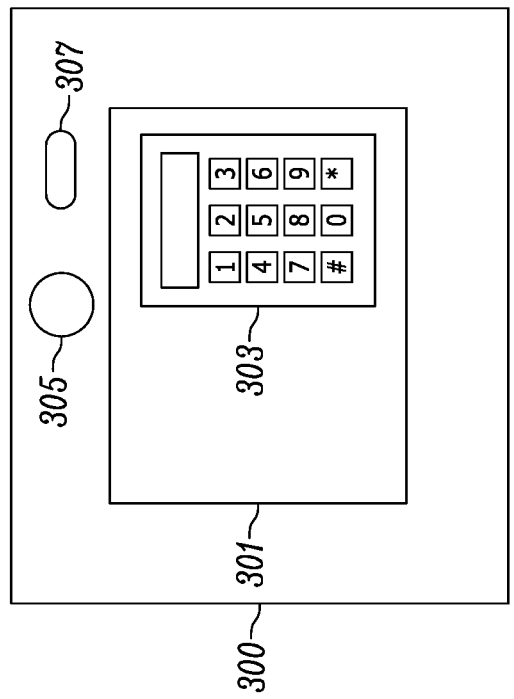
FIG. 3 is a front view of a safe with an electronic locking mechanism configured as the secured electronic device of FIG. 1 in accordance with some embodiments.

FIG. 3 shows another example of the secure device 100 implemented as a locking safe 300. The safe 300 includes a door 301 and an electronic locking mechanism 303 that includes a 12-button keypad and a display. The electronic locking mechanism 303 is configured to unlock the door 301 when a correct sequence of numeric characters is input through its keypad. The safe 300 is also equipped with a front-facing camera 305 positioned to capture images of a user operating the electronic locking mechanism 303 and a microphone 307 configured to capture audio stream data.

The secure device 100 is configured to provide user access and functionality on a restricted basis. For example, the smart phone 200 of FIG. 2 may be configured to allow access to certain functionality provided by software applications only after an alphanumeric password is entered through the user interface 201. Similarly, the safe 300 of FIG. 3 is configured to allow physical access to the interior space of the safe 300 by opening the door 301 only after a correct sequence of numeric characters is entered through the keypad of the electronic locking mechanism 303. Furthermore, certain software applications or functionality operating on the secure device 100 may be designed to be viewed or used by only a single, specific user.

User assistance can occur in a variety of different ways and can, in some circumstances, enable an unauthorized person to gain access to an electronic device or certain restricted functionality of the electronic device. Some examples of types of user assistance that might possible be identified as unacceptable user assistance for a particular device or a function of the device may include multiple people viewing the display screen 105 at the same time, copying information from the display screen 105 to another device or document, copying information from another device or document into the user interface of the secure device 100, and opening a program or entering information in response to verbal instructions received from another person. In some situations, these types of user assistance may be considering to be indicative of a risk of an unauthorized user viewing restricted information or attempting to gain access to a restricted device. For example, an unauthorized user may be attempting to coerce an authorized user into telling him the password to gain access to the secure device 100.

To help ensure that restricted functionality of the secure device 100 is accessed and operated only by authorized users, the secure device electronic processor 101 is configured to detect certain types of user assistance and to determine whether such user assistance violates a defined user assistance restriction (i.e., whether the detected type of user assistance is authorized or unauthorized). In some implementations, the specific type(s) of user assistance that is authorized or explicitly unauthorized may be varied depending on the current function of the secure device 100. As discussed in further detail below, a look-up table may be configured and stored on the secure device memory 103 defining the user assistance restrictions for the secure device 100 or for individual functional operations of the secure device, for example, by providing a list of specific types of user assistance that are unacceptable for each of a plurality of functional operations.

Figure 4:
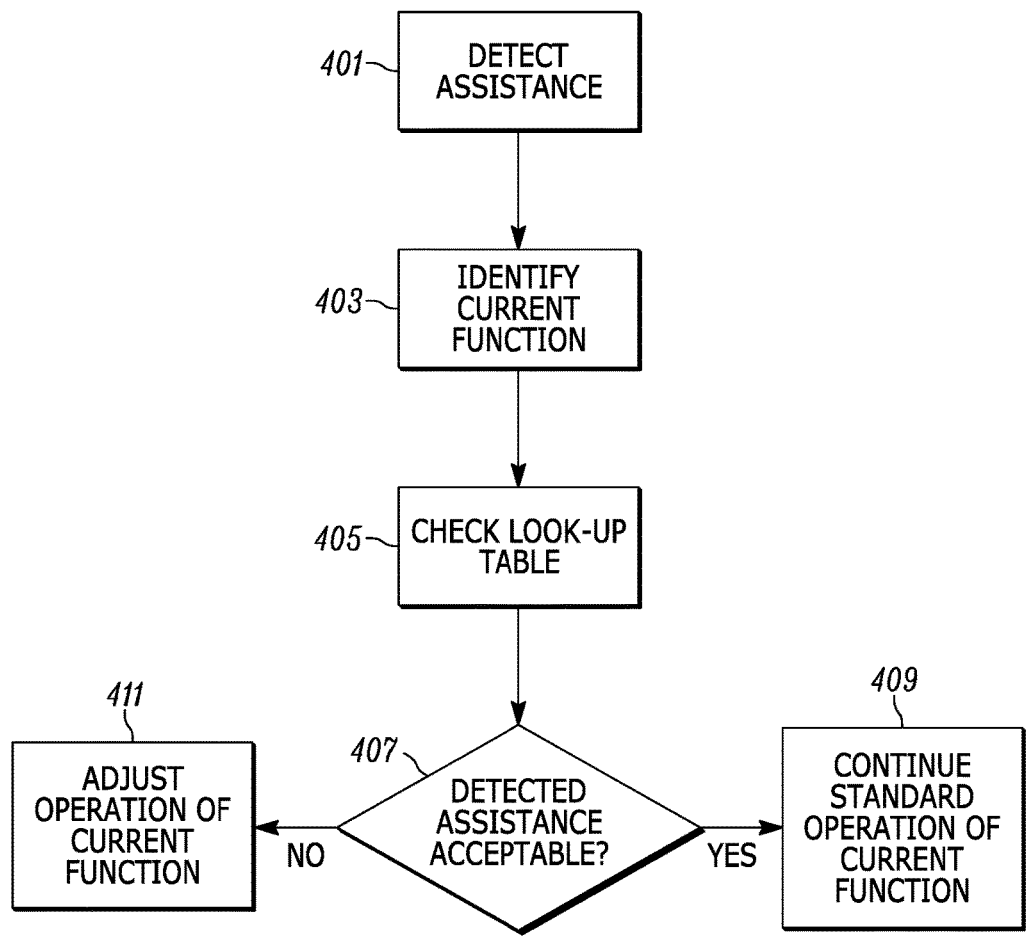
FIG. 4 is a flowchart of a method of controlling the operation of the secured electronic device of FIG. 1 by detecting unauthorized user assistance in accordance with some embodiments.

FIG. 4 illustrates an example of a method for detecting one or more types of user assistance, determining whether a detected type of user assistance violates a user assistance restriction, and operating the device based on that determination. While the secure device 100 is operating, the secure device electronic processor 101 will periodically check for one or more particular types of user assistance at block 401. Some examples of methods for detecting these particular types of user assistance are discussed in detail below. When user assistance is detected at block 401, the secure device electronic processor 101 identifies the current functional operation of the secure device 100 at block 403 and then accesses a look-up table stored on the secure device memory 103. In this example, the look-up table includes a list of any specific types of user assistance that have been indicated as unacceptable assistance for each of a plurality of different functional operations of the secure device. In some implementations, the look-up table can be configured by the developer of the secure device 100 or a particular software application running on the secure device 100. In other implementations, the look-up table can be created and modified by a system administrator to configure the device based on data and device access rules for a particular organization.

If, based on the identified current functional operation and the accessed look-up table, the secure device electronic processor 101 determines at block 407 that the detected user assistance is an acceptable type of assistance (i.e., does not violate a user assistance restriction), then the secure device electronic processor 101 continues with the standard operation of the current function at block 409. However, if the detected user assistance is identified by the look-up table as an unacceptable type of user assistance, then the secure device electronic processor 101 adjusts the operation of the current function at block 411.

The precise way in which the secure device electronic processor 101 adjusts the operation of the current function may vary depending on the particular implementation, the specific type of assistance that is detected, or the specific type of functional operation. For example, in some implementations, if the current functional operation is a password entry and the detected user assistance indicates that the entered password was spoken verbally while the password was entered through the user interface, then the secure device electronic processor 101 may reject the password and prevent access to the secure device 100. In some such implementations, the secure device electronic processor 101 may also output a warning that is displayed on the display screen 105 or may transmit a notification or an "alert signal" to a remote computer system through the transceiver 113 indicating that a suspected attempt at unauthorized access has been detected. In other implementations, the secure device electronic processor 101 may disable the secure device 100 or "black out" the displayed output on the display screen 105 in response to detecting a violation of certain types of violations of user assistance restrictions. Similarly, in some implementations, the secure device electronic processor 101 may be configured to adjust the operation of the current function by providing limited access to some functionality of the device when unacceptable user assistance is detected. In some implementations, the secure device electronic processor 101 is further configured to log a data entry indicating the day, the time, and/or the location of the secure device 100 at the time that the unacceptable user assistance is detected, so that the information might be used later to investigate possible unauthorized use of the secure device 100.

Figure 5:
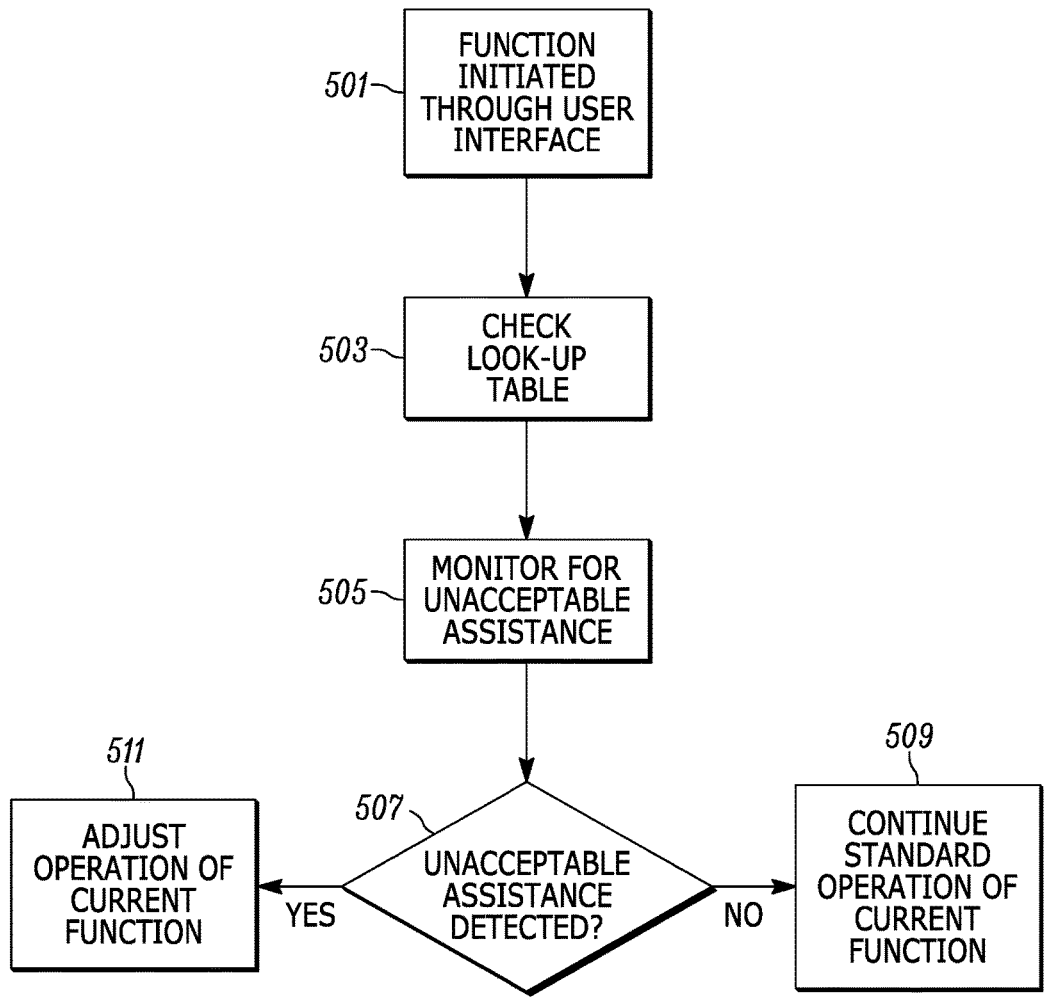
FIG. 5 is a flowchart of an alternative method of controlling the operation of the secured electronic device of FIG. 1 by detecting unauthorized user assistance in accordance with some embodiments.

In the example of FIG. 4, the secure device 100 is configured to periodically monitor for multiple types of user assistance and, in response to detecting a condition indicative of such assistance, to determine whether the detected type of assistance is acceptable. However, in some implementations, the secure device 100 is configured to monitor for unacceptable assistance only in response to the initiation of a particular functional operation. One example of such a method is illustrated in FIG. 5.

When a functional operation of the secure device 100 is initiated through the user interface at block 501 (e.g., the secure device 100 is turned on, a password entry screen is displayed, a particular software application is launched, or a request to view a particular type of data is received), the secure device electronic processor 101 accesses the look-up table stored on the secure device memory 103 at block 503 and monitors for any particular types of unacceptable assistance identified in the look-up table (i.e., violations of a defined user assistance restriction for the current functional operation) at block 505.

If the secure device electronic processor 101 does not detect any type of unacceptable user assistance at block 507, then it continues with standard operation of the current function at block 509. However, if a type of user assistance that has been identified as unacceptable is detected at block 507, then the secure device electronic processor 101 adjusts the operation of the current function at block 511, for example, as discussed above in reference to FIG. 4.

The secure device electronic processor 101 is configured to detect certain types of user assistance based on various types of information including, for example, data captured by the secure device 100 or inputs received through the user interface of the secure device 100. FIGS. 6 through 10 illustrate some examples of methods that may be applied by the secure device electronic processor 101 in some implementations to detect user assistance based on data from the camera 109 or the microphone 111. In some implementations, the secured device electronic processor 101 may be configured to apply one or more of these methods to detect user assistance, for example, at block 401 of FIG. 4 or at block 505 of FIG. 5.

Figure 6:
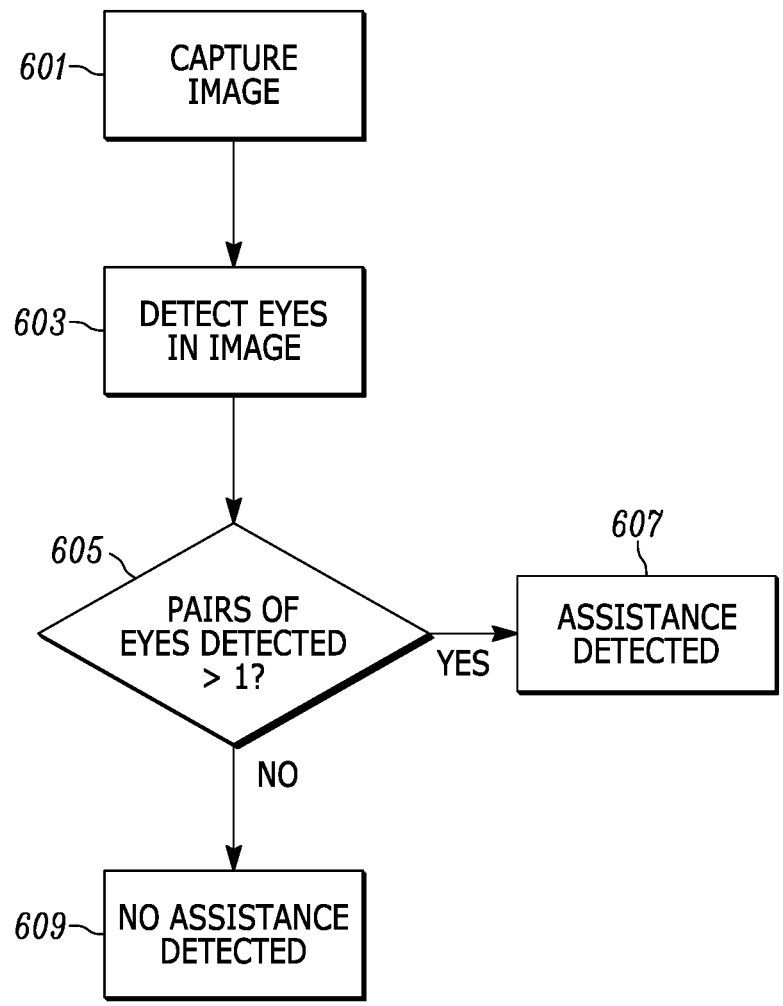
FIG. 6 is a flowchart of a method of detecting unauthorized user assistance by detecting a number of eyes in an image captured by a camera of the secured device of FIG. 1 in accordance with some embodiments.

The example of FIG. 6 provides a method for detecting when multiple persons are viewing the display screen 105 of the secure device 100. First, the camera 109 of the secure device 100 captures an image at block 601. As discussed above in the examples of FIG. 2 and FIG. 3, the camera 109 is positioned with a field of view that is likely to capture an image of one or more people viewing the display screen 105 (e.g., a front-facing camera on a smart phone). The secure device electronic processor 101 then processes the captured image to detect eyes in the image at block 603. In this example, the secure device electronic processor 101 does not apply any face recognition routines to attempt to identify the user. Instead, the secure device electronic processor 101 simply detects eyes in the image and determines whether the image captured by the camera 109 includes more than one pair of eyes at block 605 indicating multiple people viewing the display screen 105. If more than one pair of eyes is detected in the image, the secure device electronic processor 101 determines that user assistance is detected at block 607. However, if one or fewer pairs of eyes are detected in the image, then the secure device electronic processor 101 determines that no assistance is detected by the method of FIG. 6 at block 609.

Figure 7:
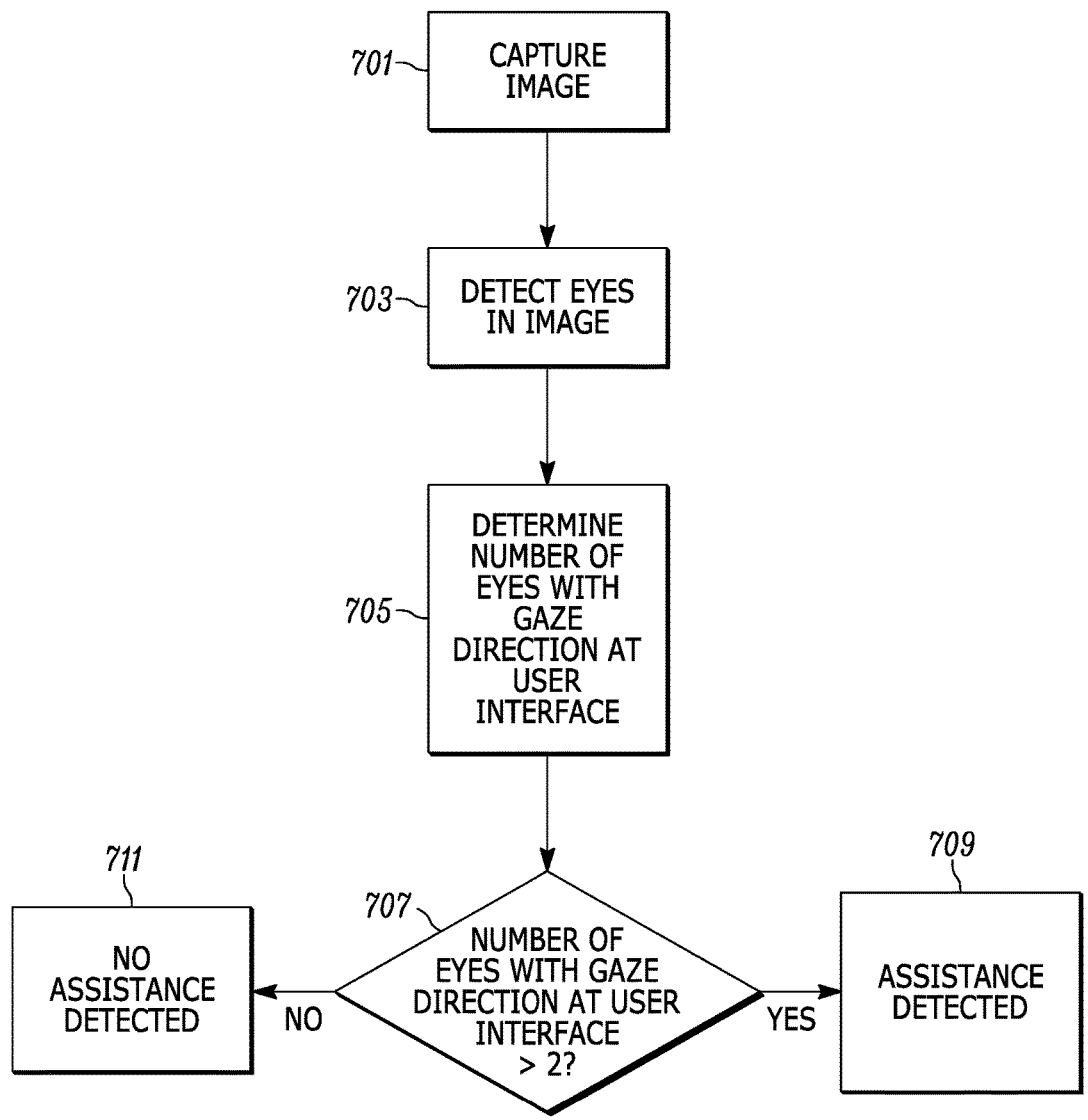
FIG. 7 is a flowchart of a method of detecting unauthorized user assistance by determining a gaze direction of eyes detected in an image captured by a camera of the secured device of FIG. 1 in accordance with some embodiments.

FIG. 7 illustrates another example of a method for detecting multiple users viewing the display screen 105 of the secure device 100. In some implementations, the method of FIG. 7 can be applied instead of or in addition to the method of FIG. 6. Again the camera 109 captures an image at block 701 and the secure device electronic processor 101 processes the image to detect eyes in the image at block 703. However, instead of only counting the number of eyes in the image, the secure device electronic processor 101 further analyzes the image to determine whether a gaze direction of each detected eye is directed at the user interface of the secure device 100 (i.e., the display screen 105) at block 705. If the secure device electronic processor 101 determines that the number of eyes that are detected with a gaze direction directed at the user interface exceeds two at block 707, then it determines that user assistance in the form of multiple users viewing the user interface is detected at block 709. However, if two or fewer eyes are detected with a gaze direction toward the user interface at block 707, then the secure device electronic processor 101 determines that this type of user assistance is not detected at block 711.

Figure 8:
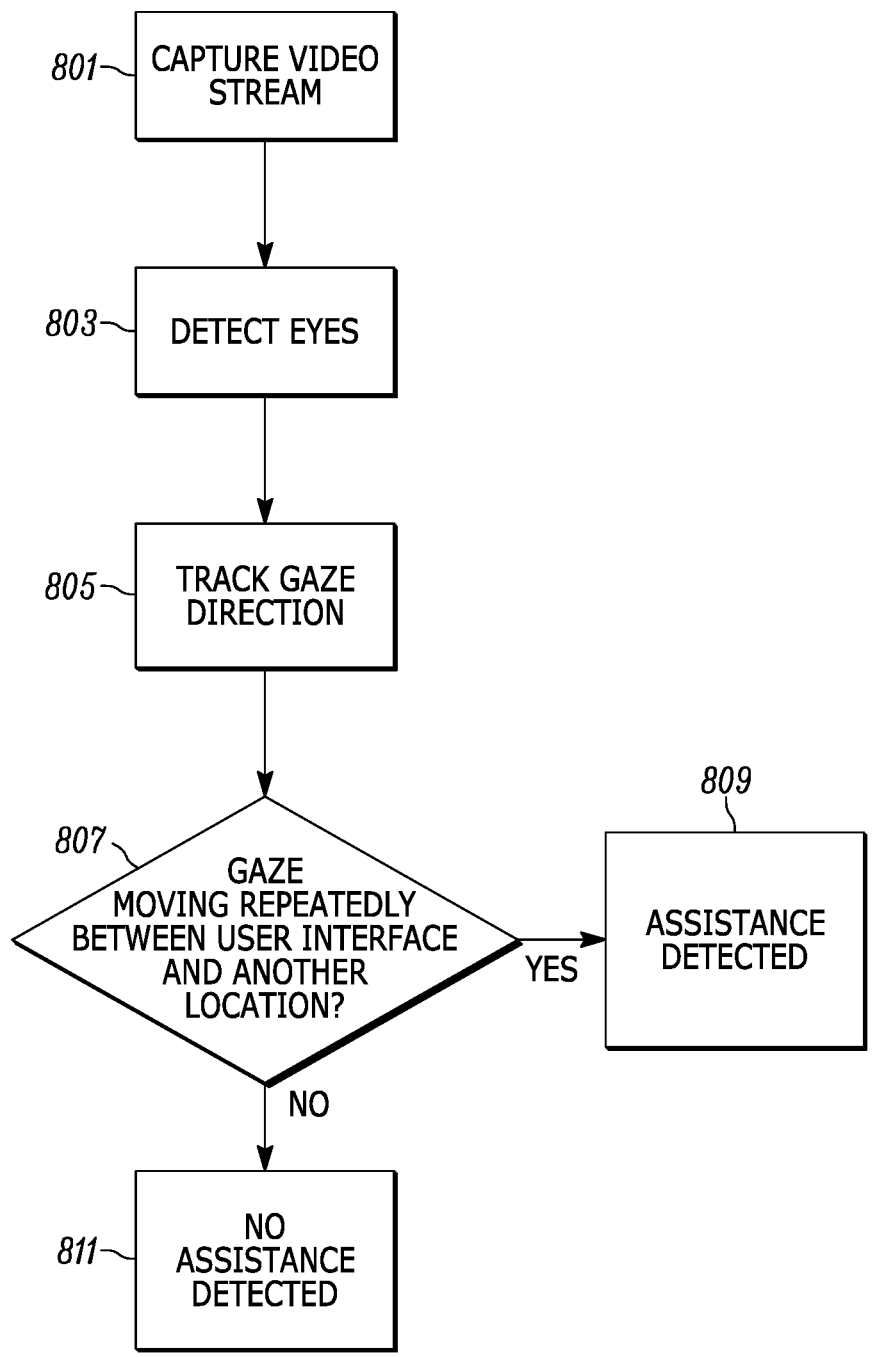
FIG. 8 is a flowchart of a method of detecting unauthorized user assistance by tracking movement of a gaze direction of eyes detected in a video stream captured by a camera of the secured device of FIG. 1 in accordance with some embodiments.

Although, in the examples discussed above in FIGS. 6 and 7, the secure device electronic processor 101 is configured to analyze still images to detect user assistance, in some implementations, the secure device electronic processor 101 can be configured to analyze a series of images or a video stream to detect user assistance. FIG. 8 illustrates an example of a method in which video stream data is analyzed to detect when a user's gaze is repeatedly moving between the display screen 105 and another location, which is potentially indicative of a user copying data displayed on the display screen 105 or copying data from another source into the user interface of the secure device 100. For example, this detectable behavior may be indicative of a user copying a password written on a piece of paper into a password entry screen.

The camera 109 captures a video stream at block 801 and the secure device electronic processor 101 processes multiple frames of the video stream to detect eyes in the captured images at block 803. The secure device electronic processor 101 tracks movements of the eyes in successive frames of the video stream to track changes in a gaze direction at block 805. If the secure device electronic processor 101 detects that the gaze direction moves repeatedly between the user interface of the secure device 100 and another location at block 807, then it determines that criteria indicative of possible user assistance by copying data to or from the user interface of the secure device 100 is detected at block 809. However, if such repeated movements of the gaze direction are not detected at block 807, then the secure device electronic processor 101 determines that this type of user assistance is not detected at block 811.

Figure 9:
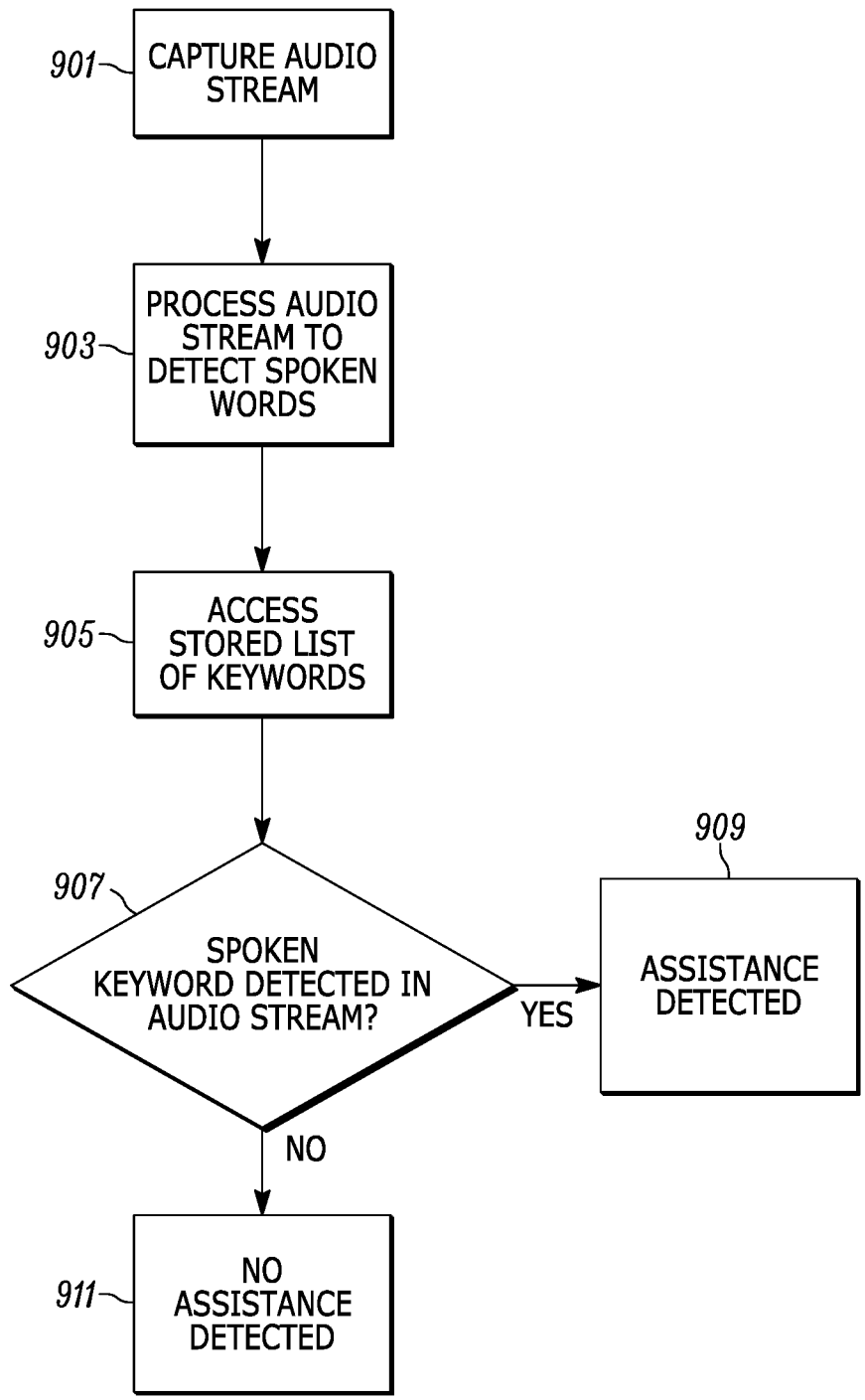
FIG. 9 is a flowchart of a method of detecting unauthorized user assistance by detecting spoken keywords in an audio stream captured by a microphone of the secured device of FIG. 1 in accordance with some embodiments.

FIG. 9 illustrates an example of a method for detecting user assistance based on audio stream data captured by the microphone 111 of the secure device 100. The microphone 111 captures an audio stream at block 901 and the secure device electronic processor 101 processes the audio stream to detect spoken words at block 903. The secure device electronic processor 101 accesses a stored list of keywords from the secure device memory 103 at block 905 and determines whether any of the keywords in the accessed list are detected in the spoken words of the audio stream at block 907. If so, the secure device electronic processor 101 determines that user assistance in the form of verbal instructions or suggestions provided to an operator of the secure device 100 is detected at block 909. However, if none of the keywords are detected in the spoken words of the audio stream at block 907, then the secure device electronic processor 101 determines that this type of user assistance is not detected at block 911.

In some implementations, the list of keywords in the example of FIG. 9 can be predefined by a manufacturer or developer of the secure device 100 or a software application running on the secure device 100. In other implementations, the list of keywords can be created and modified by a system administrator based on the needs and access restrictions of a particular organization. In still other implementations, the secure device electronic processor 101 may be configured to continue to update the list of keywords based on spoken words that are detected in the audio stream, for example, while other types of unacceptable user assistance are detected.

In some implementations, such as in the example of FIG. 9 above, the secure device electronic processor 101 is configured to determine that assistance is detected when a single keyword from the accessed list is detected in the audio stream. In other implementations, the secure device electronic processor 101 is configured to calculate a value indicative of a weighted probability of user assistance based at least in part on a number of keywords that are detected in the audio stream and to determine that a violation of the user assistance restriction has occurred when the calculated value exceeds a predefined threshold. In still other implementations, the list of keywords stored on the secure device memory 103 includes multiple categories of keywords and requires detection of one or more keywords from each category before concluding that user assistance is detected.

For example, in some implementations, the list of keywords may include a list of function keywords and a list of action keywords for each of a plurality of different functional operations of the secure device 100. In some implementations, at least one keyword from the list of function keywords and at least one keyword from the list of action keywords must be detected in the audio stream data in order for the secure device electronic processor 101 to determine that this type of user assistance is detected. In some implementations, a function keyword must be detected before the action keyword in the audio stream in order for this type of user assistance to be detected.

Accordingly, the general method illustrated in FIG. 9 can be extended to various other types of natural language processing to correlate a sequence of actions or functional operations on the secure device 100 to strings of spoken words detected in the captured audio stream. For example, a secure device may be configured with a keyword list that is accessed when a police patrolling software application is launched on the secure device 100. The keyword list may include function keywords such as "public safety," "patrolling," and "policing" and the action keywords such as "see," "show," and "point." If the captured audio stream includes the spoken words "Wow! You have a patrolling app? Can you show it to me?" the secure device electronic processor 101 would determine that user assistance is detected because the spoken words of the audio stream include at least one function keyword—"Patrolling"—and at least one action keyword—"show."

Figure 10:
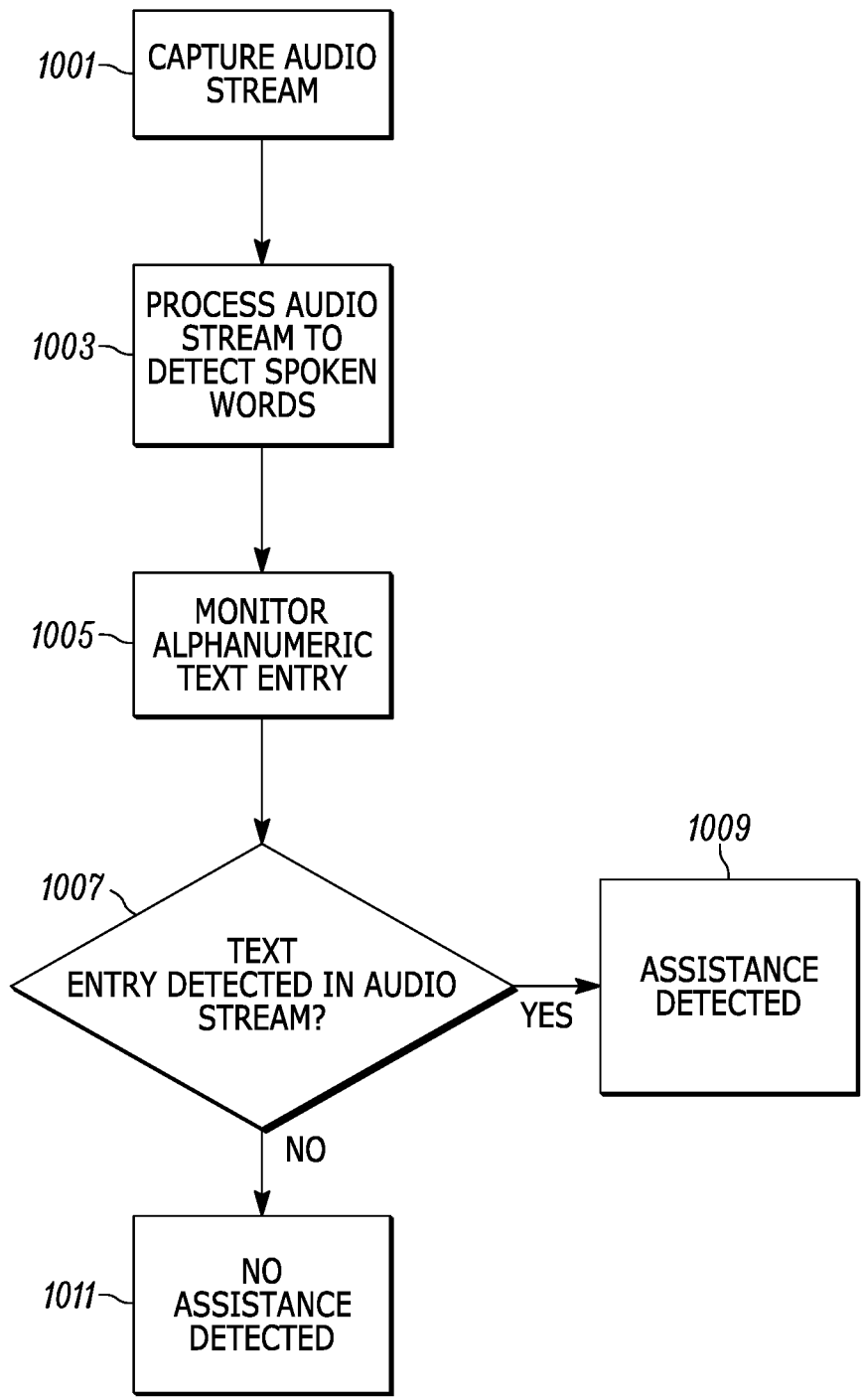
FIG. 10 is a flowchart of a method of detecting unauthorized user assistance by determining a sequence of alphanumeric characters entered through a user interface of the secured device of FIG. 1 and detecting the same string of alphanumeric characters spoken in an audio stream captured by a microphone of the secured device of FIG. 1 in accordance with some embodiments.

In some implementations, the secure device electronic processor 101 is further configured to correlate spoken words from the captured audio stream with alphanumeric text entered into the secure device 100 through the input device 107. FIG. 10 illustrates an example of a method for detecting user assistance relating to dictation or verbal instructions given for alphanumeric text entry into the device, for example, during entry of a password to gain access to the secure device 100.

The microphone 111 captures an audio stream at block 1001 and the secure device electronic processor 101 processes the audio stream data to detect spoken words at block 1003. The secure device electronic processor 101 also monitors alphanumeric text entered through the input device 107 at block 1005. If the alphanumeric text entered through the input device correlates to spoken words detected in the audio stream data at block 1007, the secure device electronic processor 101 determines that user assistance in the form of verbal dictation or prompting is detected at block 1009. However, if the alphanumeric text entry cannot be correlated to spoken words detected in the audio stream data, then the secure device electronic processor 101 determines that this type of user assistance is not detected at block 1011.

The methods illustrated in FIGS. 6 through 10 are only some examples of techniques that can be implemented by the secure device 100 to detect specific types of user assistance. Some implementations may include one or more of these techniques to detect user assistance. Other implementations may utilize other techniques for detecting these or other types of user assistance in addition to or instead of the examples illustrated in FIGS. 6 through 10.

Furthermore, although the examples illustrated in FIGS. 1, 2, and 3 include both a camera 109, 203, 305 and a microphone 111, 205, 307, in some implementations, the secure device 100 may include only a camera 109 and not a microphone 111 or, in the alternative, only a microphone 111 and not a camera 109. In other implementations, the secured device 100 may include both a camera 109 and a microphone 111, but may be configured to detect unauthorized user assistance using data captured by only the camera 109 or only the microphone 111. In still other embodiments, the secure device 100 may be configured to detect unauthorized user assistance based on other data in addition to or instead of images or video captured by a camera 109 and audio stream data captured by the microphone 111.

Figure 11:
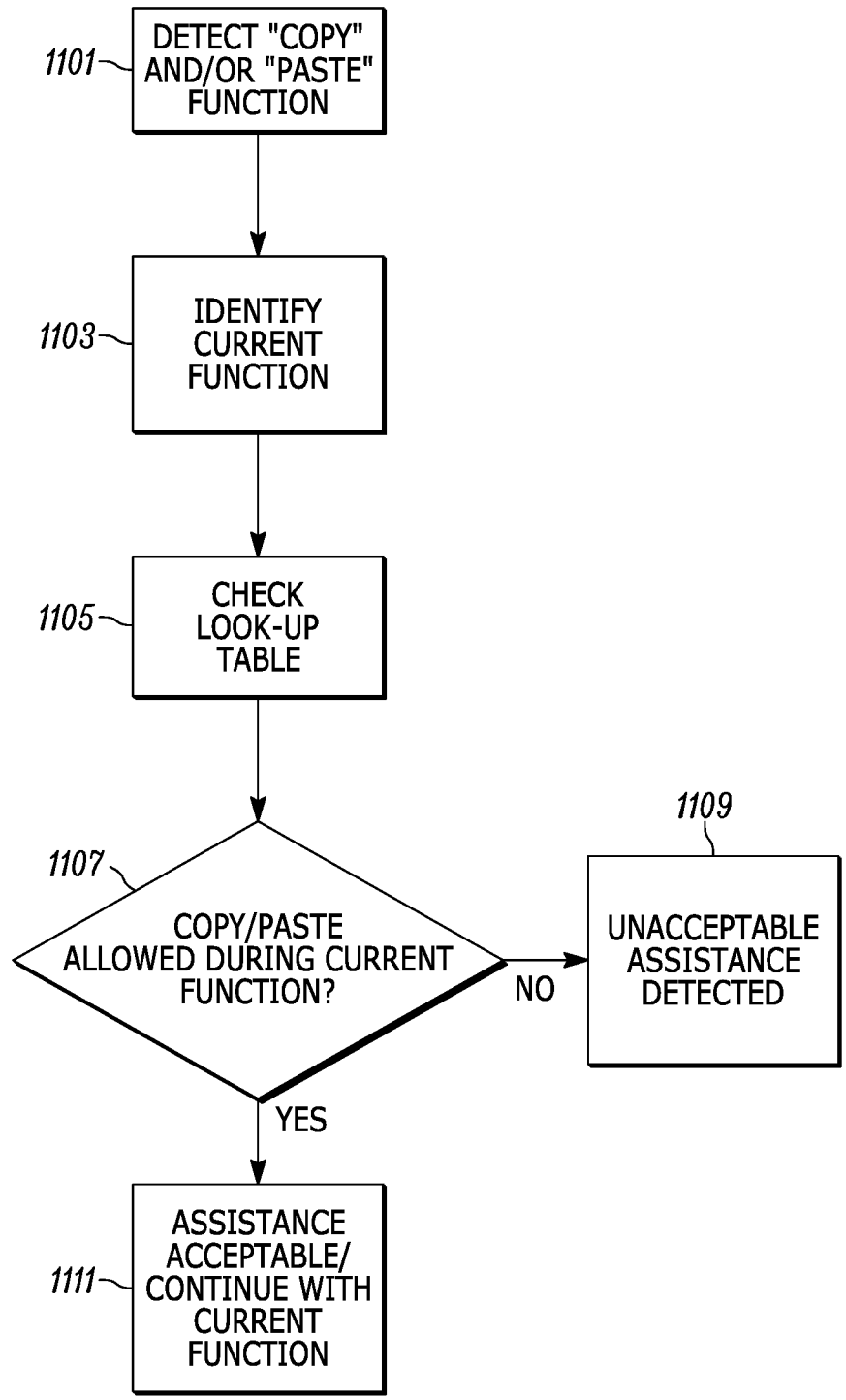
FIG. 11 is a flowchart of a method of detecting unauthorized use of a text entry assistance function in the secured device of FIG. 1 in accordance with some embodiments.

For example, FIG. 11 illustrates an example of a method that determines whether certain other types of data entry techniques are used and whether those data entry techniques have been identified as an unacceptable form of assistance for a particular secure device 100 or a particular functional operation of the secure device 100. In particular, the secure device electronic processor 101 detects that a "COPY" or "PASTE" function is used on the secure device 100 at block 1101. The secure device electronic processor 101 identifies the current function of the secure device 100 at block 1103 and accesses a look-up table stored on the secure device memory 103 at block 1105 that identifies any specific types of user assistance that have been identified as unacceptable user assistance for the particular function. If the look-up table indicates that usage of the detected "COPY" or "PASTE" function is not permitted for the current operation at block 1107, then the secure device electronic processor 101 determines that unacceptable assistance in the form of an unpermitted COPY or PASTE function is detected at block 1109. However, if the look-up table indicates that usage of the COPY or PASTE function is permitted for the current function of the secure device 100, then the secure device electronic processor 101 determines that the detected user assistance is acceptable and continues with normal operation of the current function at block 1111.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or " contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of operating an electronic device by detecting unauthorized user assistance, the electronic device including a user interface, a camera, and an electronic processor, the method comprising:
   determining, by the electronic processor, whether a user assistance restriction is established for a current functional operation of the electronic device, wherein the user assistance restriction for the current functional operation includes a user viewing another device or object while a user input is received from the user through the user interface;
   capturing, by the camera, a series of images, wherein the camera is positioned to capture a series of images of a user of the electronic device;
   analyzing, by the electronic processor, the series of images to detect changes in a gaze direction of one or more eyes in the field of view of the camera;
   detecting, by the electronic processor, a violation of the user assistance restriction by determining, based at least in part on the analysis of the series of images, that the gaze direction of the one or more eyes detected in the series of images repeatedly moves between the user interface and the other device or object while the user input is received through the user interface; and
   adjusting, by the electronic processor, one or more operations of the electronic device in response to detecting the violation of the user assistance restriction.

2. The method of claim 1, further comprising detecting a violation of another user assistance restriction by detecting two or more pairs of eyes from the plurality of eyes in the field of view of the camera.

3. The method of claim 1, further comprising:
   analyzing at least one image captured by the camera by detecting whether a gaze direction of each eye from a plurality of eyes in the at least one image is directed towards the user interface; and detecting a violation of another user assistance restriction by detecting that the gaze direction of more than two eyes from the plurality of eyes detected in the at least one image is directed at the user interface of the electronic device.

4. The method of claim 1, wherein adjusting the one or more operations of the electronic device includes transmitting an alert signal to a remote computer system in response to detecting the violation of the user assistance restriction.

5. The method of claim 1, wherein adjusting the one or more operations of the electronic device includes storing a data record logging the violation in response to detecting the violation of the user assistance restriction.

6. The method of claim 1, wherein adjusting the one or more operations of the electronic device includes adjusting a displayed output to display a warning message or to black out the displayed output in response to detecting two or more users viewing the user interface.

7. The method of claim 1, further comprising detecting when the violation of the user assistance restriction occurs during password entry,
wherein adjusting the one or more operations of the electronic device includes providing access to some operations of the electronic device in response to receiving a password entry while limiting access to the one or more operations of the electronic device in response to detecting the violation of the user assistance restriction during the password entry.

8. The method of claim 1, further comprising calculating a value indicative of a probability of unauthorized user assistance based at least in part on the analysis of the series of images captured by the camera, and
wherein detecting the violation of the user assistance restriction includes detecting the violation when the value is greater than a predefined threshold.

9. An electronic device comprising:
a user interface;
a camera positioned to capture images of a user of the electronic device; and
an electronic processor configured to
determine whether a user assistance restriction is established for a current functional operation of the electronic device, wherein the user assistance restriction for the current functional operation include a user viewing another device or object while a user input is received from the user through the user interface,
analyze a series of images captured by the camera to detect changes in a gaze direction of one or more eyes in the series of images captured by the camera,
detect a violation of the user assistance restriction by determining, based at least in part on the analysis of the series of images, that the gaze direction of the one or more eyes detected in the series of images repeatedly moves between the user interface and the other device or object while the user input is received through the user interface, and
adjust one or more operations of the electronic device in response to detecting the violation of the user assistance restriction.

10. The electronic device of claim 9, wherein the electronic processor is further configured to detect a violation of another user assistance restriction by detecting two or more pairs of eyes from a plurality of eyes in at least one image captured by the camera.

11. The electronic device of claim 9, wherein the electronic processor is further configured to
analyze at least one image captured by the camera to detect whether a gaze direction of each eye from a plurality of eyes in the at least one image is directed towards the user interface, and
detect a violation of another user assistance restriction by detecting that the gaze direction of more than two eyes from the plurality of eyes detected in the at least one image is directed at the user interface of the electronic device.

12. The electronic device of claim 9, wherein the electronic processor is configured to adjust the one or more operations of the electronic device by transmitting an alert signal to a remote computer system in response to detecting the violation of the user assistance restriction.

13. The electronic device of claim 9, wherein the electronic processor is configured to adjust the one or more operations of the electronic device by storing a data record logging the violation in response to detecting the violation of the user assistance restriction.

14. The electronic device of claim 9, wherein the electronic processor is configured to adjust the one or more operations of the electronic device by adjusting a displayed output to display a warning message or to black out the displayed output in response to detecting two or more users viewing the user interface.

15. The electronic device of claim 9, wherein the electronic processor is further configured to detect when the violation of the user assistance restriction occurs during password entry, and
wherein the electronic processor is configured to adjust the one or more operations of the electronic device by providing access to some operations of the electronic device in response to receiving a password entry while limiting access to the one or more operations of the electronic device in response to detecting the violation of the user assistance restriction during the password entry.

16. The electronic device of claim 9, wherein the electronic processor is further configured to calculate a value indicative of a probability of unauthorized user assistance based at least in part on the analysis of the series of images captured by the camera, and
wherein the electronic processor is configured to detect the violation of the user assistance restriction by detecting the violation when the value is greater than a predefined threshold.

17. The method of claim 1, wherein adjusting one or more operations of the electronic device in response to detecting the violation of the user assistance restriction includes automatically adjusting the one or more operations of the electronic device without providing any indication of the detected violation through the user interface.

18. The method of claim 1, wherein determining whether a user assistance restriction is established for the current functional operation of the electronic device includes
identifying the current functional operation of the electronic device based at least in part on an identification of a software application with which the user is currently interacting through the user interface;
accessing a look-up table stored on a non-transitory computer-readable memory; and
determining, by the electronic processor, whether a user assistance restriction is defined in the look-up table for the current functional operation.

19. The electronic device of claim 9, wherein the electronic processor is configured to adjust the one or more operations of the electronic device in response to detecting the violation of the user assistance restriction by automatically adjusting the one or more operations of the electronic device without providing any indication of the detected violation through the user interface.

20. The electronic device of claim 9, wherein the electronic processor is configured to determine whether a user assistance restriction is established for the current functional operation of the electronic device by
- identifying the currently functional operation of the electronic device based at least in part on an identification of a software application with which the user is currently interacting through the user interface,
- accessing a look-up table stored on a non-transitory computer-readable memory; and
- determining whether a user assistance restriction is defined in the look-up table for the current functional operation.

* * * * *